United States Patent [19]

Dickhart, III et al.

[11] Patent Number: 4,732,372
[45] Date of Patent: Mar. 22, 1988

[54] DAMPERS FOR MECHANICAL RAILWAY SPRINGS

[75] Inventors: William W. Dickhart, III, Fort Washington; James M. Herring, Jr., Merion Station, both of Pa.

[73] Assignee: Budd Company, Troy, Mich.

[21] Appl. No.: 885,505

[22] Filed: Jul. 11, 1986

Related U.S. Application Data

[63] Continuation of Ser. No. 642,004, Aug. 20, 1984, abandoned.

[51] Int. Cl.⁴ ................................................ F16F 1/12
[52] U.S. Cl. ..................................... 267/204; 267/287
[58] Field of Search ................ 267/9 B, 33, 169, 170, 267/179.60, 615, 8 R, 9 R, 61 R

[56] References Cited

U.S. PATENT DOCUMENTS

| | | | |
|---|---|---|---|
| 1,934,579 | 11/1933 | Wine | 267/9 B |
| 2,189,208 | 2/1940 | Holland | 267/9 B |
| 2,815,201 | 12/1957 | Girod-Eymery | 267/9 B |
| 3,862,751 | 1/1975 | Schwaller | 267/179 X |

FOREIGN PATENT DOCUMENTS 229057 10/1924 United Kingdom ................ 267/33

Primary Examiner—George E. A. Halvosa
Assistant Examiner—Matthew C. Graham
Attorney, Agent, or Firm—Steele, Gould & Fried

[57] ABSTRACT

Damping elements physically contact some of the coils on one or more mechanical coil springs disposed between a railway car body and a truck. The coils contacted may be at the ends of the springs or at areas between the ends. When double springs are involved, with one being spaced within the other, the damping elements are disposed in the space between the springs at the ends thereof.

2 Claims, 8 Drawing Figures

U.S. Patent  Mar. 22, 1988  Sheet 1 of 2  4,732,372
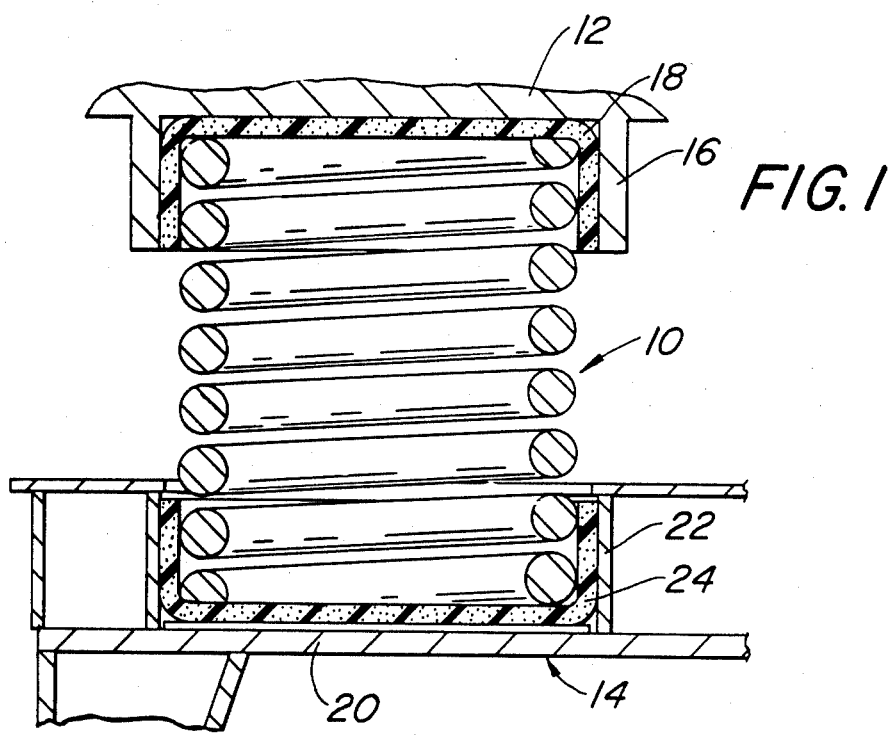
FIG. 1
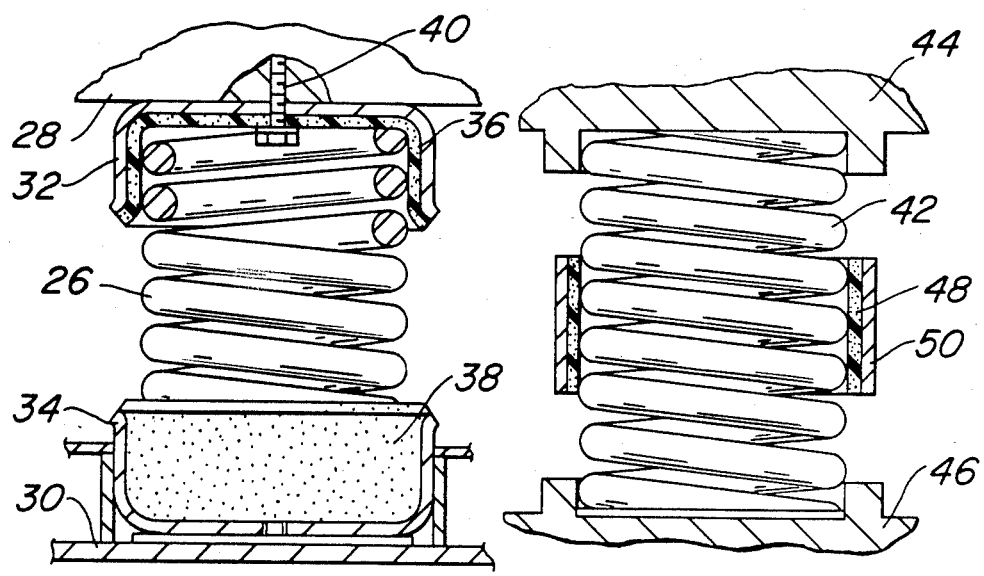
FIG. 2
FIG. 3

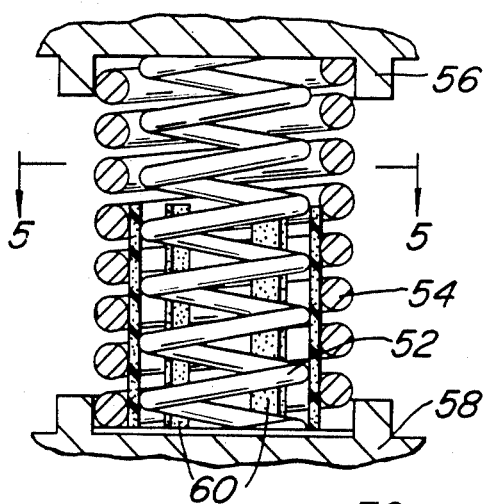
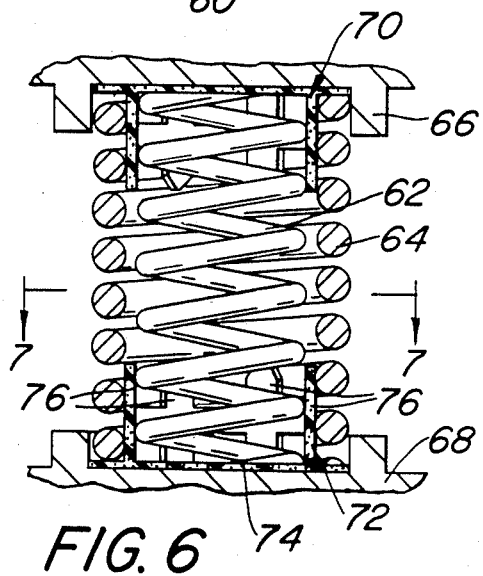
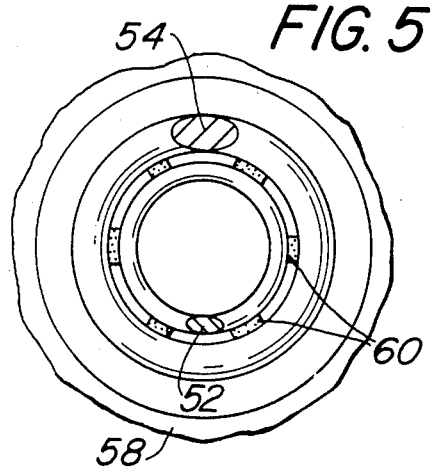
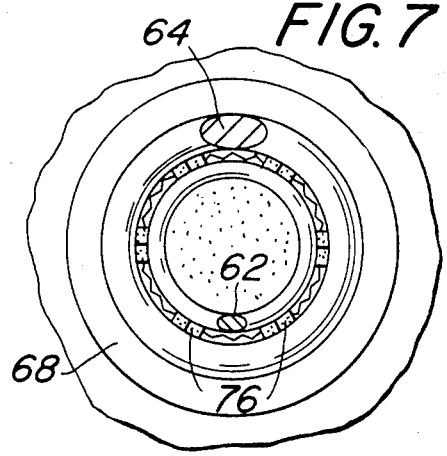
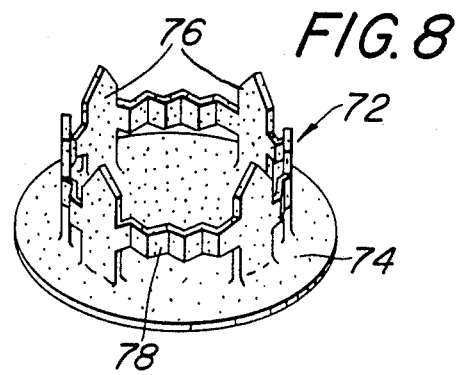

DAMPERS FOR MECHANICAL RAILWAY SPRINGS

This is a continuation of application Ser. No. 06/642,004 filed 8/20/84, now abandoned.

BACKGROUND OF THE INVENTION

Vibrations, surges and noise developed in mechanical springs in a railway car are generally transmitted to the car body. This causes passenger discomfort.

The vibrations, surges, and noise result from a number of operation conditions. For example, mechanical springs may have natural frequencies at which they tend to vibrate. Sudden impacts transmitted from the tracks may cause surges and noise in the springs, which in turn are transmitted to the car body.

Different types of damping elements have been used in connection with mechanical springs. Generally, these have been located at the top and bottom of the springs. Such arrangements have not been entirely successful in railway car applications, especially where double spring arrangements are used when one spring is disposed inside the other with some space therebetween.

Some patents relating to spring damping include U.S. Pat. Nos. 3,795,390; 3,977,700; 3,762,694; 2,660,423; 2,822,165 and 3,206,184.

OBJECTS OF THE INVENTION

It is an object of this invention to provide improved damping members for mechanical springs in a railway car.

It is a further object of this invention to provide improved damping means to minimize the transmission of vibrations, noise and surges from mechanical springs to a railway car body.

It is still a further object of this invention to provide an improved damping arrangement for double springs with one spring disposed in a spaced relationship within the other.

It is a further object of this invention to provide improved damping means to minimize the transmission of impact forces from a truck to mechanical springs.

BRIEF SUMMARY OF THE INVENTION

In accordance with the present invention, a mechanical coil spring is disposed between a car body and a truck. Damping means are provided to damp vibrations, surges and noise developed in the spring and prevent them from being transmitted to the car body. The damping means physically contact coils at different areas of the spring.

Other objects and advantages of the present invention will be apparent and suggest themselves to those skilled in the art, from a reading of the following specification and claims, taken in conjunction with the accompanying drawings.

BRIEF DESCRIPTION OF THE DRAWINGS

FIG. 1 is a cross-sectional view of a mechanical spring having damping members connected to a truck and a car body in accordance with the present invention;

FIGS. 2 and 3 are two different embodiments having damping means partly in cross-section, in accordance with the present invention;

FIG. 4 illustrates another partly cross-sectional view of another embodiment of the present invention;

FIG. 5 is a view taken along lines 5—5 of FIG. 4;

FIG. 6 is another partly cross-sectional view of another embodiment of the present invention;

FIG. 7 is a view taken along lines 7—7 of FIG. 6; and

FIG. 8 is an isometric view of a damping member adapted to be fitted at the ends and between two mechanical springs, in accordance with the present invention.

DESCRIPTION OF THE INVENTION

Referring to FIG. 1, a spring 10 is disposed between a car body 12 and a truck 14. The car body 12 may include an integral cup-like portion 16 for receiving a damping member 18 therein.

The truck 14 includes a bolster 20 and member 22 having a damping member 24 therein.

The embodiment illustrated involves a contrained damping material, which may be made of elastomeric, fibrous or leather-like material. Dependent upon the particular design requirements, it may be necessary only to provide damping at one end of the spring either at the top or bottom. In other cases, it is desirable to provide the damping at the top and bottom of the springs 10 as illustrated. An advantage of the double damping arrangement is that the damping material 18 provides isolation between the spring 10 and the car body 12 and the member or material 24 provides isolation between the truck 14 and the spring 10. Consequently any impacts resulting from the track irregularities tend to be minimized by the member 24. Any vibrations resulting from actual resonant frequencies of the mechanical spring 10 will tend to be isolated from the car body by the damping material or members 18 and 24.

It is noted that the members 18 and 24 physically contact the top and bottom coils of the spring 10. This provides greater damping as compared with situations used heretofore, where the damping material was placed directly on the top or bottom of the spring member.

Referring to FIG. 2, a somewhat similar embodiment to that illustrated in FIG. 1 is shown. A mechanical spring 26 is disposed between a car body 28 and a truck 30. Cup elements 32 and 34 include damping members 36 and 38 respectively. The cup elements and damping members are separated from the car and truck. This facilitates the manufacturing of the elements which must then be secured together by means of a mechanical means such as a screw 40. The basic operation of the embodiments of FIGS. 1 and 2 is the same. The only difference is that in FIG. 2 the cup elements and damping members may be assembled separately and connected to the car and truck during the manufacturing operation as those units.

Referring to FIG. 3, a mechanical spring 42 is disposed between a car body 44 and a truck 46. The damping member 48 or material is disposed between the ends of the spring 42 and engage a number of the coils in the spring. A metal retaining means 50 maintains the damping member 48 against the spring 42 thereby providing damping of any tendency to vibrate or surge within the spring.

Referring to FIGS. 4 and 5, a pair of mechanical springs 52 and 54 are disposed between a car body 56 and truck 58 in a spaced relationship therewith. Such a double spring arrangement is well known and illustrated in a patent to Dean U.S. Pat. No. 3,580,557.

A plurality of strips 60 are inserted in the space between the springs 52 and 54 and contact the coils in both springs 52 and 54. The strips are made of suitable damping material such as elastomeric material or the like. The strips 60 are maintained in a spaced relationship with respect to each other and act to damp any tendency of the spring to vibrate or surge. In addition, the springs are kept out of contact with each other thereby minimizng the likelihood of additional noise or surges which may be developed and transmitted to the car body 56.

Referring to FIGS. 6, 7 and 8, a pair of spaced mechanical springs 62 and 64 are disposed between a car body 66 and a truck 68. The top cap element 70 is disposed between the ends of the spring 62 and 64 and the car body 66. In like manner a cap 72 is disposed between the bottom ends of the springs 62 and 64 and the truck 68. Both of the caps 70 and 72 are similar in design and only the bottom cap 72 illustrated in FIG. 8 will be described in detail. It is understood that the top caps 70 operate in a similar manner to bottom caps 72.

Bottom cap 72 comprises a base 74 with prong elements 76 extending therefrom. The prong elements 76 include interconnecting convoluted sections 78.

Caps 70 and 72 are inserted in the space between the springs 62 and 64. When the cap elements are inserted, the projecting portions 76 and the convoluted portions 78 engage a number of the upper and lower coils of the springs 62 and 64.

The cap elements 70 and 72 are made of suitable damping material such as elastomeric, fibrous or leather type material. The caps 70 and 72 may be a suitable molded integral piece and for easy insertion between a pair of mechanical springs.

What is claimed is:

1. In combination with a railway car body and a truck.
   (a) a first inner vertically disposed mechanical coil spring connected between said car body and said truck;
   (b) a second outer vertically disposed mechanical coil spring spaced from and surrounding said first spring connected between said car body and said truck;
   (c) a pair of integral cap members composed of damping material;
   (d) each of said cap members including a flat circular base portion having a plurality of projecting sections extending therefrom;
   (e) said projecting sections including interconnecting convoluted portions spaced from said base portion;
   (f) said projecting sections of said cap members being vertically disposed and dimensioned to fit into the space between said first and second springs at opposite ends thereof with said convoluted interconnecting portions being vertically disposed and physically engaging coil windings at one of the ends of said first and second springs at areas between said projecting sections, and
   (g) said projecting sections being circumferentially spaced and parallel to each other.

2. The combination as set forth in claim 1 wherein the pair of cap members are inserted at opposite ends of said first and second springs.

* * * * *